US011879603B2

(12) United States Patent
Wenzel et al.

(10) Patent No.: US 11,879,603 B2
(45) Date of Patent: Jan. 23, 2024

(54) WORK LIGHT

(71) Applicant: MILWAUKEE ELECTRIC TOOL CORPORATION, Brookfield, WI (US)

(72) Inventors: Duane W. Wenzel, Waukesha, WI (US); Brian Cornell, West Allis, WI (US); Alan Amundson, Milwaukee, WI (US); Jun Ma, HuaiAn (CN); Jay J. Rosenbecker, Menomonee Falls, WI (US); Jing Su, LongYan (CN); Jason Isaacs, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/900,957

(22) Filed: Sep. 1, 2022

(65) Prior Publication Data

US 2022/0412516 A1 Dec. 29, 2022

Related U.S. Application Data

(63) Continuation of application No. 17/094,117, filed on Nov. 10, 2020, now Pat. No. 11,448,372.

(Continued)

(30) Foreign Application Priority Data

Jun. 22, 2020 (CN) ......................... 202021172042.0

(51) Int. Cl.
*F21L 4/02* (2006.01)
*F21L 4/04* (2006.01)
(Continued)

(52) U.S. Cl.
CPC ................. *F21L 4/027* (2013.01); *F21L 4/04* (2013.01); *F21L 4/08* (2013.01); *F21V 21/0965* (2013.01);
(Continued)

(58) Field of Classification Search
CPC ..... F21L 4/04; F21L 4/08; F21L 4/027; F21V 21/0965
See application file for complete search history.

(56) References Cited

U.S. PATENT DOCUMENTS

| | | | |
|---|---|---|---|
| D404,838 | S | 1/1999 | Magnusson |
| 5,871,272 | A | 2/1999 | Sharrah et al. |

(Continued)

FOREIGN PATENT DOCUMENTS

| | | |
|---|---|---|
| CN | 1230040 | 2/1988 |
| CN | 101146388 | 3/2008 |

(Continued)

OTHER PUBLICATIONS

International Search Report and Written Opinion for Application No. PCT/US2020/059814 dated Mar. 5, 2021 (11 pages).

(Continued)

*Primary Examiner* — William N Harris
(74) *Attorney, Agent, or Firm* — Michael Best & Friedrich LLP

(57) ABSTRACT

A work light including a body having a mount surface, a pair of ferromagnetic members coupled to the body and disposed adjacent the mount surface, and a recess defined in the mount surface in the space between the pair of ferromagnetic members. The pair of ferromagnetic members define a space therebetween. The recess is a keyhole slot configured to receive a nail from which the work light can be hung. The work light further includes a light source pivotably coupled to the body opposite the mount surface, such that the light source pivots relative to the body about a vertical axis when the work light is hung using the recess.

13 Claims, 14 Drawing Sheets

Related U.S. Application Data

(60) Provisional application No. 62/939,465, filed on Nov. 22, 2019, provisional application No. 62/939,425, filed on Nov. 22, 2019.

(51) Int. Cl.

| | |
|---|---|
| ***F21V 21/30*** | (2006.01) |
| ***F21V 23/00*** | (2015.01) |
| ***F21V 21/096*** | (2006.01) |
| ***F21V 21/40*** | (2006.01) |
| ***F21L 4/08*** | (2006.01) |
| ***F21Y 115/10*** | (2016.01) |

(52) U.S. Cl.
CPC ............ *F21V 21/30* (2013.01); *F21V 21/406* (2013.01); *F21V 23/003* (2013.01); *F21Y 2115/10* (2016.08)

(56) References Cited

U.S. PATENT DOCUMENTS

| | | | | |
|---|---|---|---|---|
| 5,988,828 | A * | 11/1999 | Prince | F21V 21/145 362/202 |
| 6,095,661 | A | 8/2000 | Lebens et al. | |
| 6,179,431 | B1 | 1/2001 | Chien | |
| 6,231,370 | B1 | 5/2001 | Morin et al. | |
| 6,305,818 | B1 | 10/2001 | Lebens et al. | |
| 6,488,390 | B1 | 12/2002 | Lebens et al. | |
| 6,573,659 | B2 | 6/2003 | Toma et al. | |
| 6,808,287 | B2 | 10/2004 | Lebens et al. | |
| D515,228 | S | 2/2006 | Gebhard et al. | |
| 7,186,000 | B2 | 3/2007 | Lebens et al. | |
| 7,186,002 | B2 | 3/2007 | Matthews et al. | |
| 7,196,477 | B2 | 3/2007 | Richmond | |
| D541,962 | S | 5/2007 | Bayat et al. | |
| D544,620 | S | 6/2007 | Son | |
| D550,387 | S | 9/2007 | Guercio | |
| D554,781 | S | 11/2007 | Shiu | |
| 7,338,189 | B2 | 3/2008 | Kovacik et al. | |
| 7,344,270 | B2 | 3/2008 | Kim | |
| D573,285 | S | 7/2008 | Zettl | |
| D573,286 | S | 7/2008 | Zettl | |
| 7,393,119 | B2 | 7/2008 | Lebens et al. | |
| 7,429,827 | B2 | 9/2008 | Richmond | |
| 7,517,107 | B2 | 4/2009 | Dallas et al. | |
| 7,591,572 | B1 | 9/2009 | Levine | |
| 7,740,371 | B1 | 6/2010 | Lebens et al. | |
| 7,850,330 | B2 | 12/2010 | Spartano et al. | |
| 7,888,883 | B2 | 2/2011 | Crawford et al. | |
| 7,942,553 | B2 | 5/2011 | Huang | |
| 7,959,317 | B2 | 6/2011 | Spartano et al. | |
| D646,822 | S | 10/2011 | Johannessen et al. | |
| 8,063,607 | B2 | 11/2011 | Crawford et al. | |
| 8,104,915 | B1 | 1/2012 | Osterhout et al. | |
| 8,115,492 | B2 | 2/2012 | Crawford et al. | |
| 8,120,268 | B2 | 2/2012 | Spartano et al. | |
| 8,134,300 | B2 | 3/2012 | Maglica et al. | |
| 8,159,146 | B1 | 4/2012 | Lebens et al. | |
| 8,197,085 | B2 | 6/2012 | Spartano | |
| D666,346 | S | 8/2012 | Gebhard et al. | |
| 8,324,836 | B2 | 12/2012 | Crawford et al. | |
| 8,362,700 | B2 | 1/2013 | Richmond | |
| 8,362,712 | B1 | 1/2013 | Lebens et al. | |
| 8,414,142 | B2 | 4/2013 | Tucker et al. | |
| 8,628,210 | B2 | 1/2014 | Tucker et al. | |
| 8,643,305 | B2 | 2/2014 | Lebens et al. | |
| D703,851 | S | 4/2014 | Gebhard et al. | |
| 8,717,034 | B2 | 5/2014 | Crawford et al. | |
| 8,727,561 | B2 | 5/2014 | Sharrah et al. | |
| D708,376 | S | 7/2014 | Crowe et al. | |
| 8,779,683 | B2 | 7/2014 | Snyder et al. | |
| 8,810,191 | B2 | 8/2014 | Maldonado | |
| D713,076 | S | 9/2014 | von Waldthausen | |
| 8,829,808 | B1 | 9/2014 | Lebens et al. | |
| 8,853,951 | B2 | 10/2014 | Garcia | |
| 8,866,392 | B2 | 10/2014 | Chen | |
| D721,841 | S | 1/2015 | Kwon et al. | |
| 8,975,822 | B2 | 3/2015 | Maglica et al. | |
| D731,687 | S | 6/2015 | Haws | |
| D734,887 | S | 7/2015 | Gebhard et al. | |
| 9,101,022 | B2 | 8/2015 | Hoffman et al. | |
| 9,119,266 | B1 | 8/2015 | Lebens et al. | |
| D739,063 | S | 9/2015 | Su | |
| D742,568 | S | 11/2015 | Abernethy | |
| 9,179,520 | B2 | 11/2015 | Trattler | |
| D745,990 | S | 12/2015 | Gebhard et al. | |
| 9,252,613 | B2 | 2/2016 | Kugel et al. | |
| D757,318 | S | 5/2016 | Evans | |
| D764,087 | S | 8/2016 | Workman et al. | |
| D766,477 | S | 9/2016 | Ma | |
| 9,447,951 | B2 | 9/2016 | Maglica et al. | |
| 9,453,624 | B2 * | 9/2016 | Sharrah | F21V 21/0885 |
| 9,549,454 | B2 | 1/2017 | Maglica et al. | |
| 9,739,467 | B1 * | 8/2017 | Lehman | F21L 4/04 |
| 9,801,256 | B2 | 10/2017 | Maglica et al. | |
| D805,666 | S | 12/2017 | Nguyen et al. | |
| D806,923 | S | 1/2018 | Koshiba | |
| D810,335 | S | 2/2018 | Evy et al. | |
| D819,245 | S | 5/2018 | Gerza | |
| D821,007 | S | 6/2018 | Chen | |
| 10,001,252 | B2 | 6/2018 | Inskeep | |
| D831,248 | S | 10/2018 | Kuhls | |
| 10,091,854 | B1 | 10/2018 | Brandon, II | |
| D852,399 | S | 6/2019 | Chen et al. | |
| D852,400 | S | 6/2019 | Wang | |
| D854,207 | S | 7/2019 | Zheng | |
| D855,228 | S | 7/2019 | Cooper et al. | |
| D857,958 | S | 8/2019 | Willows et al. | |
| 10,378,744 | B2 * | 8/2019 | Arena | F21V 23/0414 |
| D858,830 | S | 9/2019 | Grandadam | |
| D858,831 | S | 9/2019 | Proeber | |
| D858,833 | S | 9/2019 | Cooper | |
| D858,837 | S | 9/2019 | Vazquez et al. | |
| D859,718 | S | 9/2019 | Groat | |
| D861,209 | S | 9/2019 | Cooper | |
| D863,613 | S | 10/2019 | Korpi | |
| D863,615 | S | 10/2019 | Renvall | |
| D863,616 | S | 10/2019 | Renvall | |
| D866,818 | S | 11/2019 | Lindholm | |
| D867,629 | S | 11/2019 | Renvall | |
| D884,957 | S | 5/2020 | Dennis et al. | |
| D907,272 | S | 1/2021 | Takahashi et al. | |
| 11,035,556 | B2 | 6/2021 | Proeber et al. | |
| 11,098,858 | B2 | 8/2021 | Westling et al. | |
| D957,023 | S | 7/2022 | Greenwaldt et al. | |
| D982,208 | S | 3/2023 | Ouyang | |
| D986,462 | S | 5/2023 | Zhang | |
| 2003/0076051 | A1 | 4/2003 | Bowman et al. | |
| 2003/0234778 | A1 | 12/2003 | Kim | |
| 2006/0043911 | A1 | 3/2006 | Shao et al. | |
| 2006/0072306 | A1 | 4/2006 | Woodyard | |
| 2006/0109662 | A1 | 5/2006 | Reiff et al. | |
| 2006/0198132 | A1 | 9/2006 | Trigiani et al. | |
| 2007/0014103 | A1 | 1/2007 | Teng et al. | |
| 2008/0112160 | A1 * | 5/2008 | Robinson | F21S 9/02 362/183 |
| 2008/0225518 | A1 | 9/2008 | Devaney et al. | |
| 2008/0258642 | A1 | 10/2008 | Patel | |
| 2008/0304254 | A1 | 12/2008 | Canino et al. | |
| 2009/0085502 | A1 | 4/2009 | Geris et al. | |
| 2009/0134191 | A1 * | 5/2009 | Phillips | B25F 5/02 362/183 |
| 2010/0084997 | A1 | 4/2010 | Oberzeir et al. | |
| 2010/0277899 | A1 * | 11/2010 | Peak | F21V 21/06 362/183 |
| 2011/0286206 | A1 * | 11/2011 | Tucker | F21L 4/027 362/184 |
| 2012/0033412 | A1 | 2/2012 | Molina et al. | |
| 2012/0033415 | A1 | 2/2012 | Sharrah et al. | |
| 2012/0182723 | A1 | 7/2012 | Sharrah et al. | |
| 2012/0182727 | A1 | 7/2012 | Sharrah et al. | |
| 2012/0182748 | A1 | 7/2012 | McCaslin et al. | |
| 2012/0286940 | A1 | 11/2012 | Carmen, Jr. et al. | |

(56) References Cited

U.S. PATENT DOCUMENTS

| | | | | |
|---|---|---|---|---|
| 2013/0170189 | A1* | 7/2013 | Staeubli | F21L 4/04 362/109 |
| 2013/0258649 | A1 | 10/2013 | Mueckl et al. | |
| 2013/0328402 | A1 | 12/2013 | Noguchi | |
| 2014/0085876 | A1 | 3/2014 | Fields et al. | |
| 2014/0126192 | A1 | 5/2014 | Ancona et al. | |
| 2014/0126226 | A1 | 5/2014 | Wang | |
| 2015/0131276 | A1 | 5/2015 | Thompson et al. | |
| 2015/0247628 | A1 | 9/2015 | Li | |
| 2015/0267902 | A1 | 9/2015 | Zhang | |
| 2015/0276182 | A1* | 10/2015 | Aoki | F21V 23/0414 362/184 |
| 2016/0061429 | A1 | 3/2016 | Waalkes et al. | |
| 2016/0128151 | A1 | 5/2016 | Luick et al. | |
| 2016/0265754 | A1* | 9/2016 | Sun | F21V 21/08 |
| 2016/0356439 | A1 | 12/2016 | Inskeep | |
| 2017/0130912 | A1 | 5/2017 | Keller | |
| 2017/0284646 | A1 | 10/2017 | Arena et al. | |
| 2017/0292659 | A1 | 10/2017 | Bayat et al. | |
| 2018/0027627 | A1 | 1/2018 | Maglica et al. | |
| 2018/0034313 | A1 | 2/2018 | Frankland et al. | |
| 2018/0156427 | A1 | 6/2018 | Bailey et al. | |
| 2018/0224077 | A1 | 8/2018 | Bian | |
| 2018/0266637 | A1 | 9/2018 | Curlett et al. | |
| 2019/0331326 | A1 | 10/2019 | Proeber et al. | |
| 2020/0300446 | A1* | 9/2020 | Sergyeyenko | F21V 21/0965 |
| 2020/0340634 | A1 | 10/2020 | Puzio et al. | |

FOREIGN PATENT DOCUMENTS

| | | | |
|---|---|---|---|
| CN | 101485076 | A | 7/2009 |
| CN | 201360368 | | 12/2009 |
| CN | 202551454 | U | 11/2012 |
| CN | 102970787 | A | 3/2013 |
| CN | 203942676 | | 11/2014 |
| CN | 104235741 | A | 12/2014 |
| CN | 107864531 | A | 3/2018 |
| DE | 102014204971 | A1 | 11/2014 |
| EP | 2827684 | | 1/2015 |
| EP | 2927557 | A1 | 10/2015 |
| EP | 3168523 | A1 | 5/2017 |
| EP | 3508785 | A1 | 7/2019 |
| JP | 2013033644 | A | 2/2013 |
| KR | 2020160002590 | U | 7/2016 |
| WO | 2010027460 | A1 | 3/2010 |

OTHER PUBLICATIONS

Partial Supplementary European Search Report for Application No. 20888766.1 dated Nov. 8, 2023 (15 pages).

* cited by examiner

WORK LIGHT

CROSS-REFERENCE TO RELATED APPLICATIONS

This application is a continuation of U.S. patent application Ser. No. 17/094,117 filed on Nov. 10, 2020, now U.S. Pat. No. 11,448,372, which claims priority to U.S. Provisional Patent Application No. 62/939,465 filed on Nov. 22, 2019, U.S. Provisional Patent Application No. 62/939,425 filed on Nov. 22, 2019, and Chinese Patent Application No. 202021172042.0 filed on Jun. 22, 2020, the entire content of all of which are incorporated herein by reference.

TECHNICAL FIELD

The present disclosure relates to a work light, and more particularly to a battery-powered work light.

BACKGROUND

Work lights can be used to illuminate work areas that are otherwise difficult to light. Examples of these areas include work sites, ceiling spaces, basement areas, and the like.

SUMMARY

The disclosure provides, in a first aspect, a work light including a body including a mount surface and a pair of ferromagnetic members coupled to the body and disposed adjacent the mount surface. The pair of ferromagnetic members defining a space therebetween. The body further includes a recess defined in the mount surface in the space between the pair of ferromagnetic members. The recess is a keyhole slot configured to receive a nail from which the work light can be hung. The work light further includes a light source pivotably coupled to the body opposite the mount surface, such that the light source pivots relative to the body about a vertical axis when the work light is hung using the recess.

The disclosure provides in another aspect, a work light including a body including a first end, a second end opposite the first end, a mount surface disposed between the first end and the second end for mounting the work light to a structure, a power button disposed on the first end, and a battery receptacle disposed at the second end. The battery receptacle is configured to receive a battery. The work light further includes a light source head pivotally coupled to the body to pivot about a pivot axis and configured to be operated by the power button. The light source head includes a planar light panel having at least one column of light emitting diodes extending in a direction parallel to the pivot axis.

The disclosure provides, in yet another aspect, a work light including a body including a first end, a second end opposite the first end, and a mount surface disposed between the first end and the second end. The body has a first width. The work light further includes a light source head pivotally coupled to the body to pivot about a pivot axis and disposed opposite the mount surface of the body. The light source head has a length and a second width. Moreover, the work light includes a battery removably coupled to the second end of the body. The battery includes a first support surface and a second support surface perpendicular to the first support surface. The battery has a third width that is greater than the second width of the light source head. The mount surface allows the work light to be mounted to a vertical work surface. The first support surface allows the work light to be oriented and maintained in a vertical standing position on a horizontal work surface, such that the length of the light source head is oriented perpendicular to the horizontal work surface. The second support surface allows the work light to be oriented and maintained in a horizontal laying position on the horizontal work surface, such that the length of the light source head is oriented parallel to the horizontal work surface.

Other features and aspects of the disclosure will become apparent by consideration of the following detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
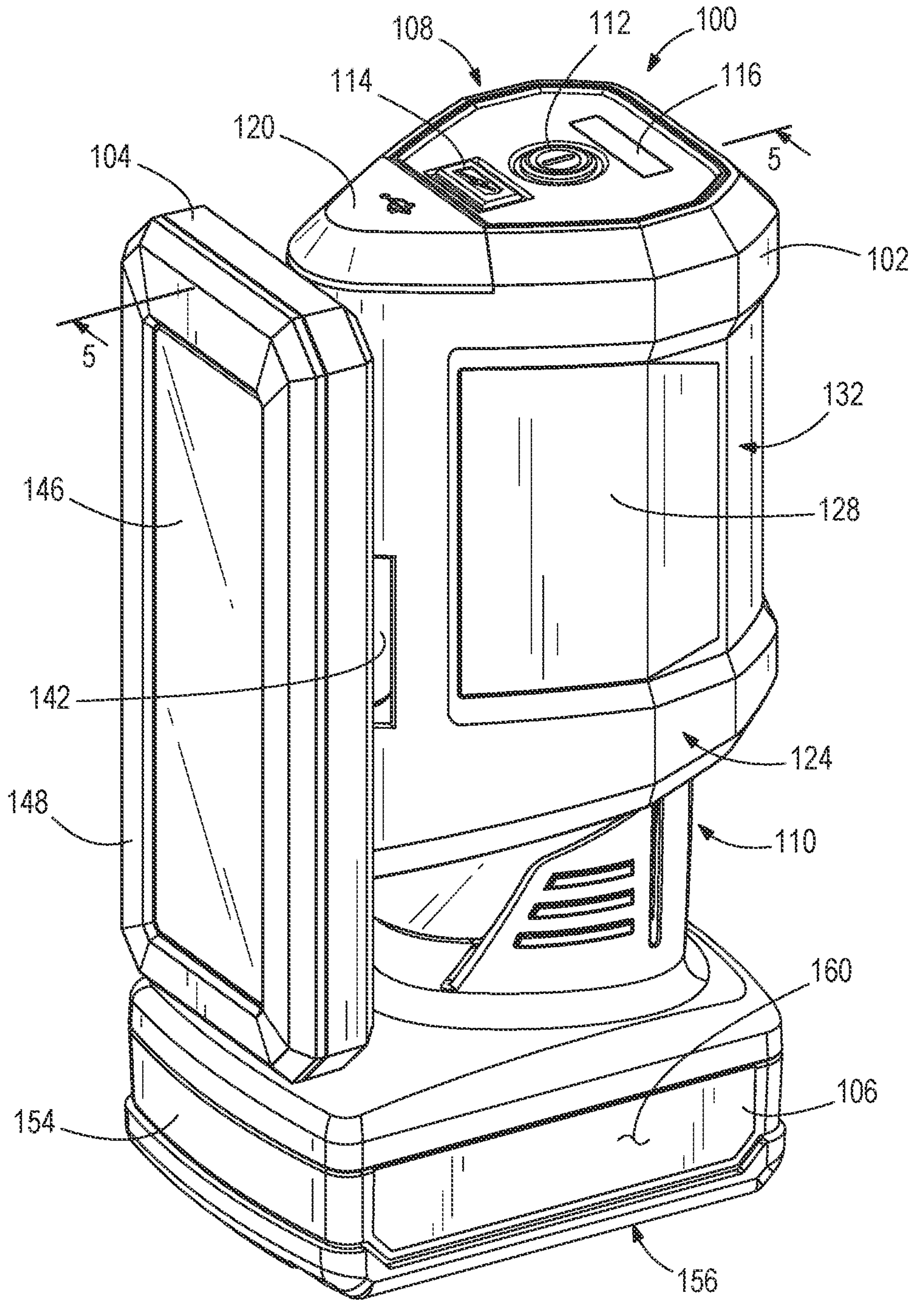
FIG. 1 is a front perspective view of a work light according to an embodiment of the disclosure.

FIG. 1 illustrates a work light 100 according to an embodiment of the present disclosure. The illustrated work light 100 is battery-powered. The work light 100 is sized and shaped for one-handed operation and transport. The work light 100 includes a body 102 and a light source head 104 coupled to the body 102. A battery 106 is also removably coupled to the body 102.

The body 102 includes a first end 108 and a second end 110 opposite the first end 108. In the illustrated embodiment, the first end 108 includes one or more controls, such as a power button 112 and a wake button 114, disposed thereon. The illustrated embodiment further includes one or more indicators, such as one or more battery power gauge lights 116, disposed on the first end 108 of the body 102.

Figure 2:
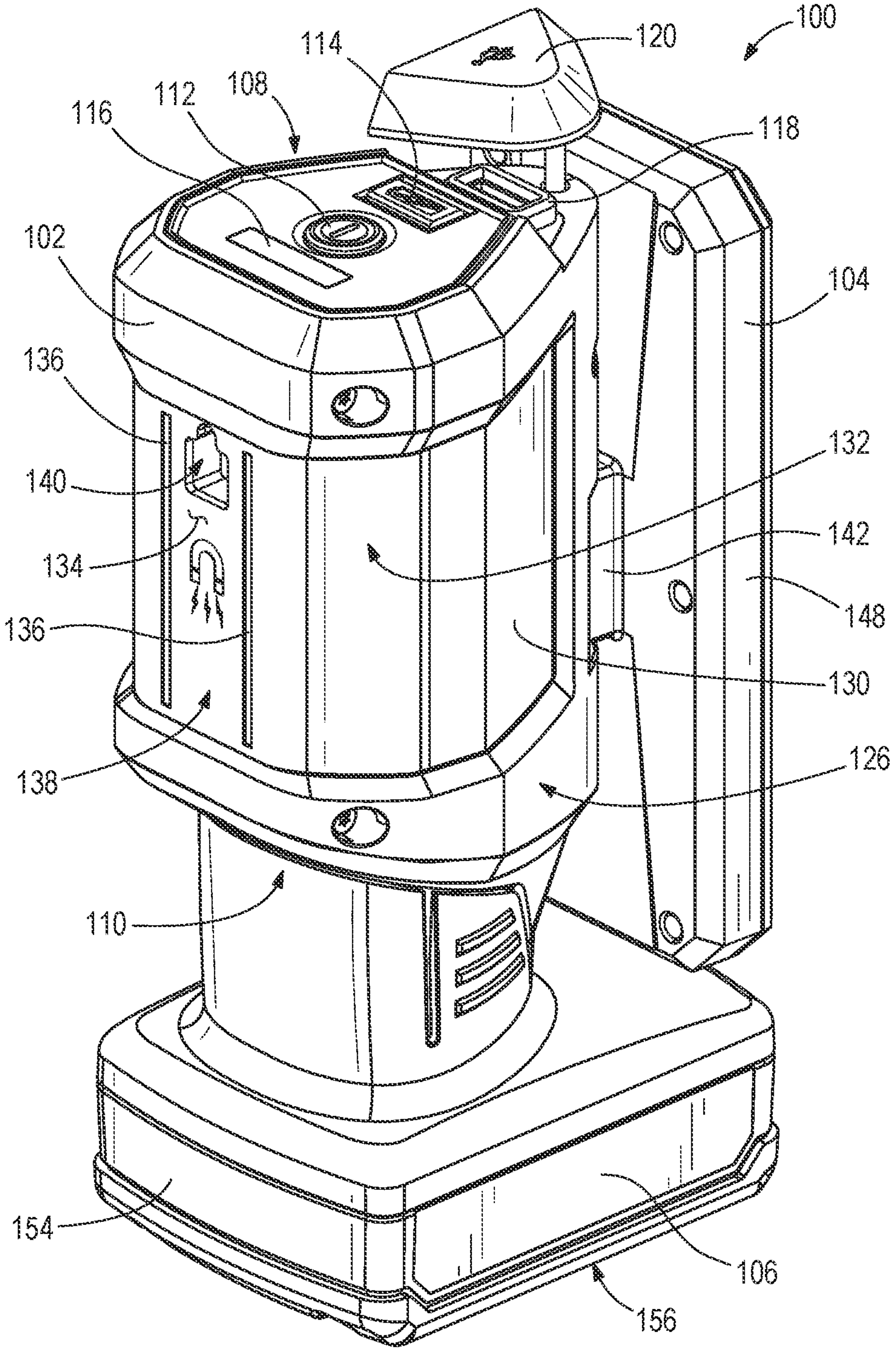
FIG. 2 is a rear perspective view of the work light of FIG. 1.

As shown in FIG. 2 of the illustrated embodiment, the body 102 further includes a charging port 118 disposed on the first end 108 of the body 102. In the illustrated embodiment, the charging port 118 is a USB port. The charging port 118 is selectively covered with a charging port cover 120 pivotably connected to the body 102. In the illustrated embodiment, the charging port cover 120 pivots and raises relative to the first end 108 of the body 102, while remaining connected to the body 102, to selectively uncover the charging port 118. In other embodiments, other suitable covers may be used. The charging port may 118 may be utilized to charge a device, such as a user's cell phone. Additionally or alternatively, the charging port 118 may be used as a power input port to charge the battery 106 without the need for removing the battery 106. Additionally or alternatively, the charging port 118 may be used as a power input port to bypass the battery 106 and power the work light 100 with an outside power source, such as mains power. The wake button 114 discussed above may be engaged by a user in order to activate the charging port 118 for energy output to charge and/or power an external device.

Of course, some or all of the controls, indicators, and the charging port 118 may instead be disposed on other portions of the work light 100 or may be omitted entirely.

Figure 5:
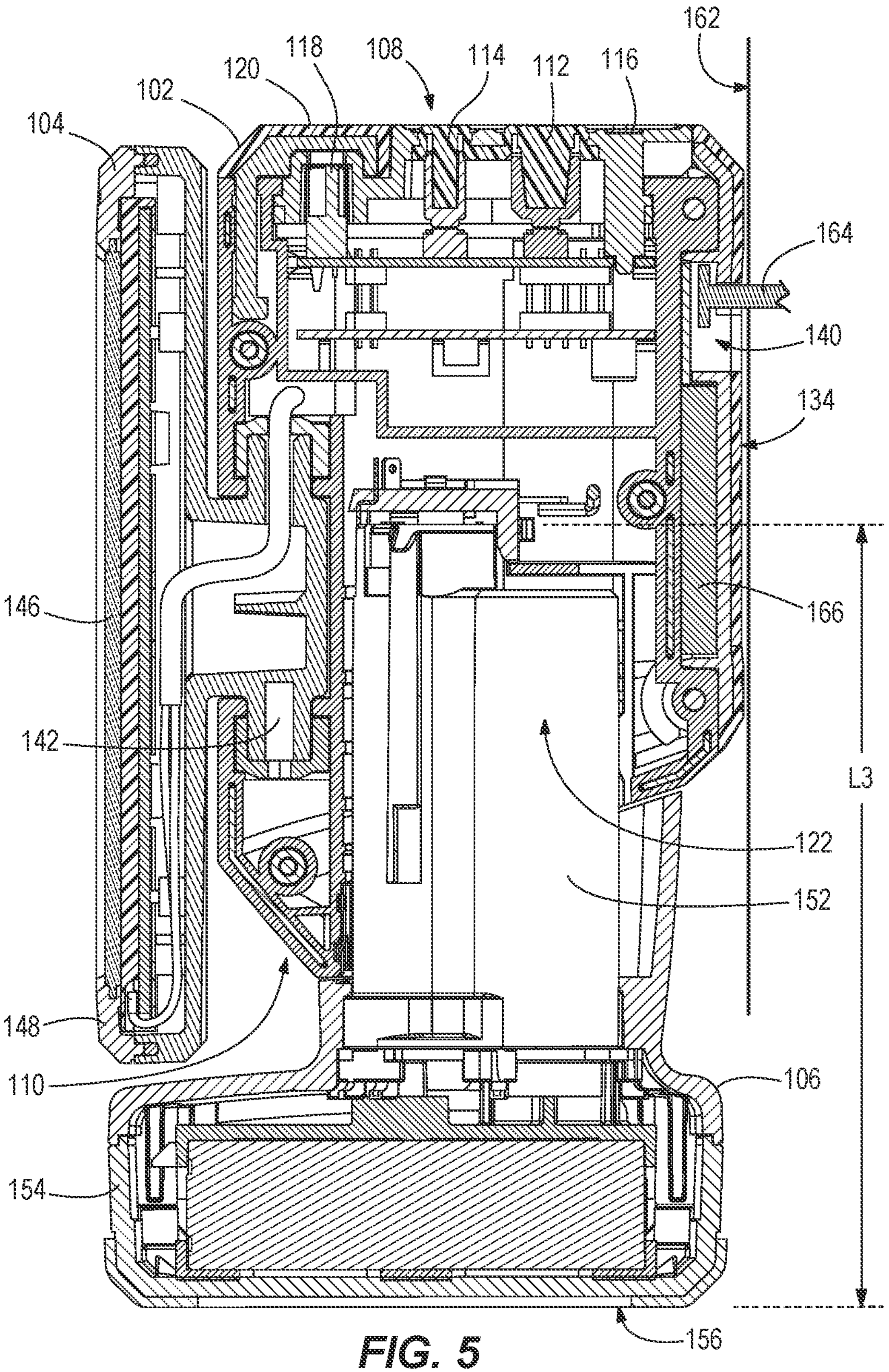
FIG. 5 is a cross-sectional side elevation view of the work light of FIG. 1 coupled to a structure.
Figure 6:
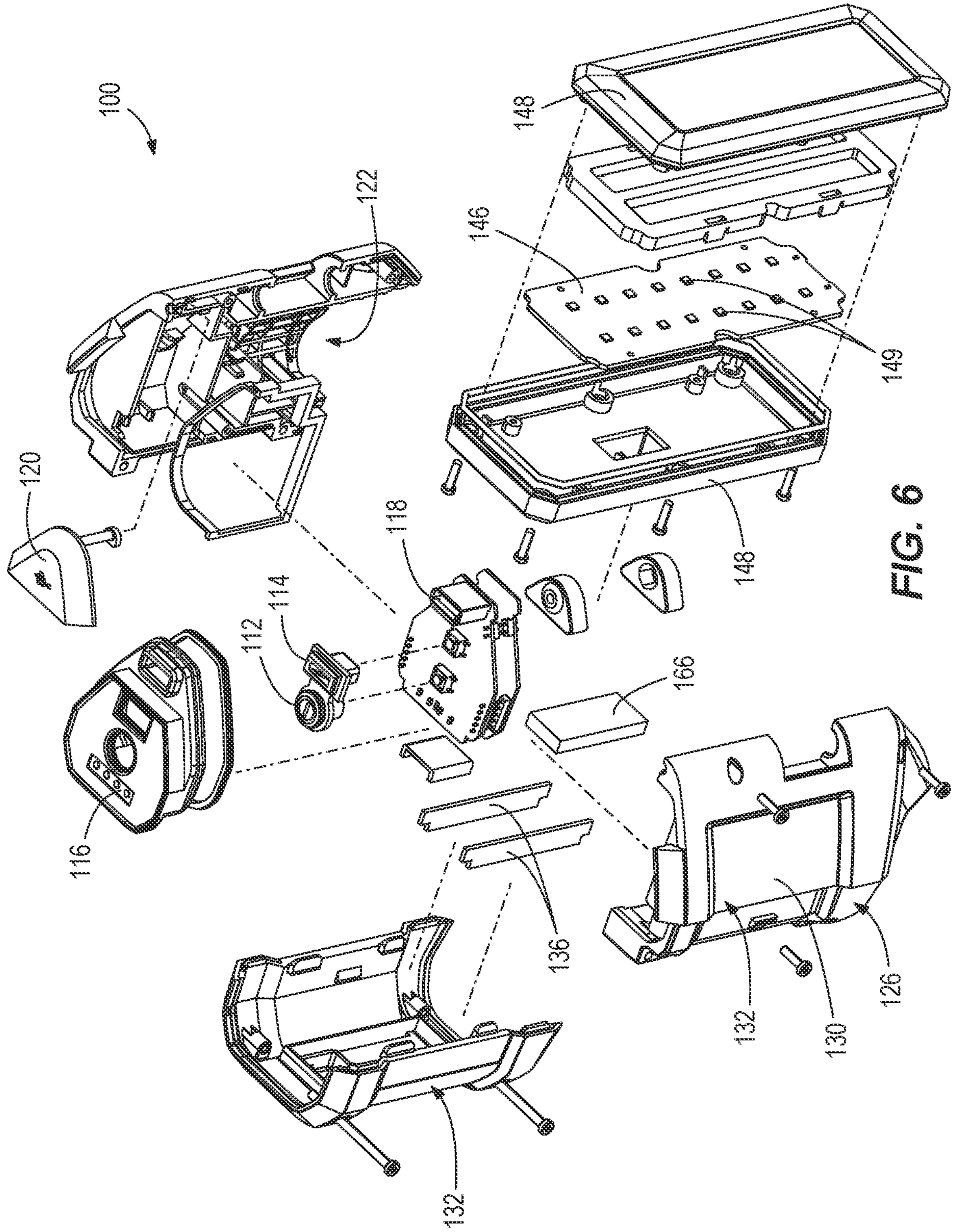
FIG. 6 is an exploded view of the work light of FIG. 1.

Shown best in FIGS. 5 and 6, the body 102 of the work light 100 further includes a battery receptacle 122 defined in the second end 110. The battery receptacle 122 receives at least a portion of the battery 106 to power the work light 100 (discussed in more detail below).

Returning to FIGS. 1 and 2, the body 102 of the work light 100 also includes two opposing sides 124, 126 extending between the first end 108 and the second end 110 of the body 102. Each side 124, 126 includes a grip section 128, 130 disposed thereon. In some embodiments, each of the first grip section 128 and the second grip section 130 includes at least part of an indentation defined in the body 102. As shown in the illustrated embodiment, a continuous indentation 132 is defined in the body 102 such that the indentation 132 extends about a majority of a perimeter of the body 102. The perimeter is defined by the outer surfaces of the body 102 located between the first end 108 and the second end 110. In this illustrated embodiment, each of the first grip section 128 and the second grip section 130 is disposed in the indentation 132. The first and second grip sections 128, 130 may be only the respective portions of the indentation 132 itself, or the grip sections 128, 130 may further include a textured surface or additional material disposed in the indentation 132 to further facilitate a secure grip of the work light 100.

With reference to FIG. 2, the body 102 further includes a mount surface 134. The mount surface 134 is disposed between the two opposing sides 124, 126, opposite from the light source head 104. The mount surface 134 allows a user to mount the work light 100 to one or more structures. In the illustrated embodiment, the body 102 includes a pair of ferromagnetic members 136 coupled thereto and disposed adjacent the mount surface 134. In some embodiments, such as the illustrated embodiment, at least a portion of each of the pair of ferromagnetic members 136 is exposed on the mount surface 134. In other embodiments, however, the ferromagnetic members 136 may be completely disposed within and concealed by the body 102. The ferromagnetic members 136 are separated from each other by a space 138.

Figure 3:
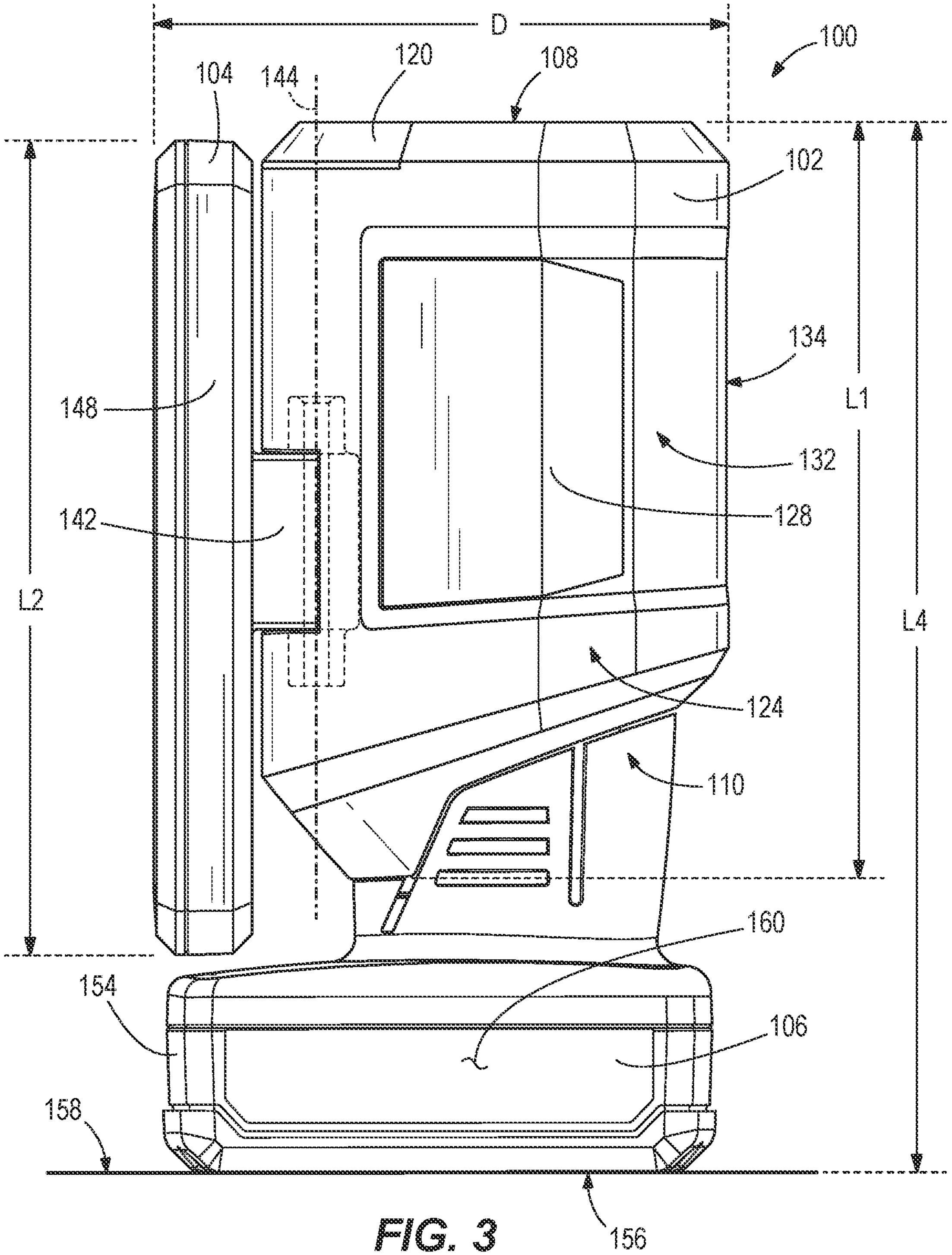
FIG. 3 is a side elevation view of the work light of FIG. 1.

In the illustrated embodiment, each of the ferromagnetic members 136 includes a length that extends in a direction that is parallel with the length L1 of the body 102 (shown in FIG. 3). Also in the illustrated embodiment, both of the ferromagnetic members 136 are disposed in the continuous indentation 132. In this embodiment, the ferromagnetic members 136 extend outward beyond the surface of the indentation 132 so as to directly engage a surface of a structure. Of course, other embodiments may include ferromagnetic member 136 that may not directly engage a surface of a structure so as to avoid scratching the surface. Such embodiments may include the ferromagnetic members 136 being flush with the surface of the indentation 132 or recessed relative to the surface of the indentation 132.

As shown in FIG. 2, a recess 140 is defined in the mount surface 134. The recess 140 is located between the ferromagnetic members 136. Stated another way, the recess 140 is located in the space 138. In the illustrated embodiment, the recess 140 is also located in the continuous indentation 132. The recess 140 may be any appropriate shape and size, but is illustrated as a keyhole slot.

With reference to FIG. 3, the light source head 104 is pivotably connected to the body 102. In the illustrated embodiment, the light source head 104 is coupled to the body 102 opposite the mount surface 134 of the body 102. As shown in FIG. 3, the light source head 104 is coupled to the body 102 by a hinge 142. In the illustrated embodiment, the light source head 104 is coupled to the body 102 by a single hinge 142 located between the first end 108 and the second end 110 of the body 102, although other embodiments may include different or additional pivotable connections between the light source head 104 and the body 102. The light source head 104 is pivotable relative to the body 102 about a pivot axis 144. In the illustrated embodiment, the pivot axis 144 extends in a direction that is parallel to the length L1 of the body 102. The light source head 104 includes a planar light panel 146 (FIG. 1) surrounded by a head frame 148 to mitigate damage to the light panel 146 from dropping the work light 100. The illustrated embodiment includes the planar light panel 146 recessed relative to the head frame 148. The light panel 146, and the light source head 104 itself, may be any size, but the illustrated embodiment includes a light panel 146 that extends along a majority of the length L1 of the body 102 of the work light 100. Further, the light panel 146 includes a plurality of light-emitting diodes (LEDs) 149, but other embodiments may include additional or alternative light sources. As shown in FIG. 6, the LEDs 149 are arranged in two parallel columns. In other embodiments, the LEDs 149 may be arranged in other configurations.

The light panel 146 may be operable in different modes, such as a HIGH mode and a LOW mode. In some embodiments, the light panel 146 may produce light having a brightness of 700 Lumens or more in the HIGH mode and a brightness of 300 Lumens or less on in the LOW mode. The work light 100 is operable to switch modes by actuating the power button 112. More specifically, the light panel 146 may produce light having a brightness of 750 lumens while in the HIGH mode and a brightness of 250 Lumens while in the LOW mode. In other embodiments, the light panel 146 may be operable in different modes and/or may be switchable between the modes by a dedicated actuator.

The light panel 146 is selectively powered by the battery 106. The illustrated battery 106 is a power tool battery having a voltage of, for example, 12 volts. The battery 106 also has a Li-ion chemistry. In other embodiments, the battery 106 may have other voltages and chemistries. The illustrated battery 106 also has a capacity of 4.0 Amp-hours (Ah). With such a battery, the light panel 146 may be powered for at least five hours while in HIGH mode and for at least ten hours while in LOW mode. In some embodiments, the light panel 146 may be powered for five to eight hours while in HIGH mode and may be powered for ten to sixteen hours while in LOW mode. In further embodiments, the light panel 146 may be powered for longer in either mode, depending on the capacity of the battery 106.

Figure 4:
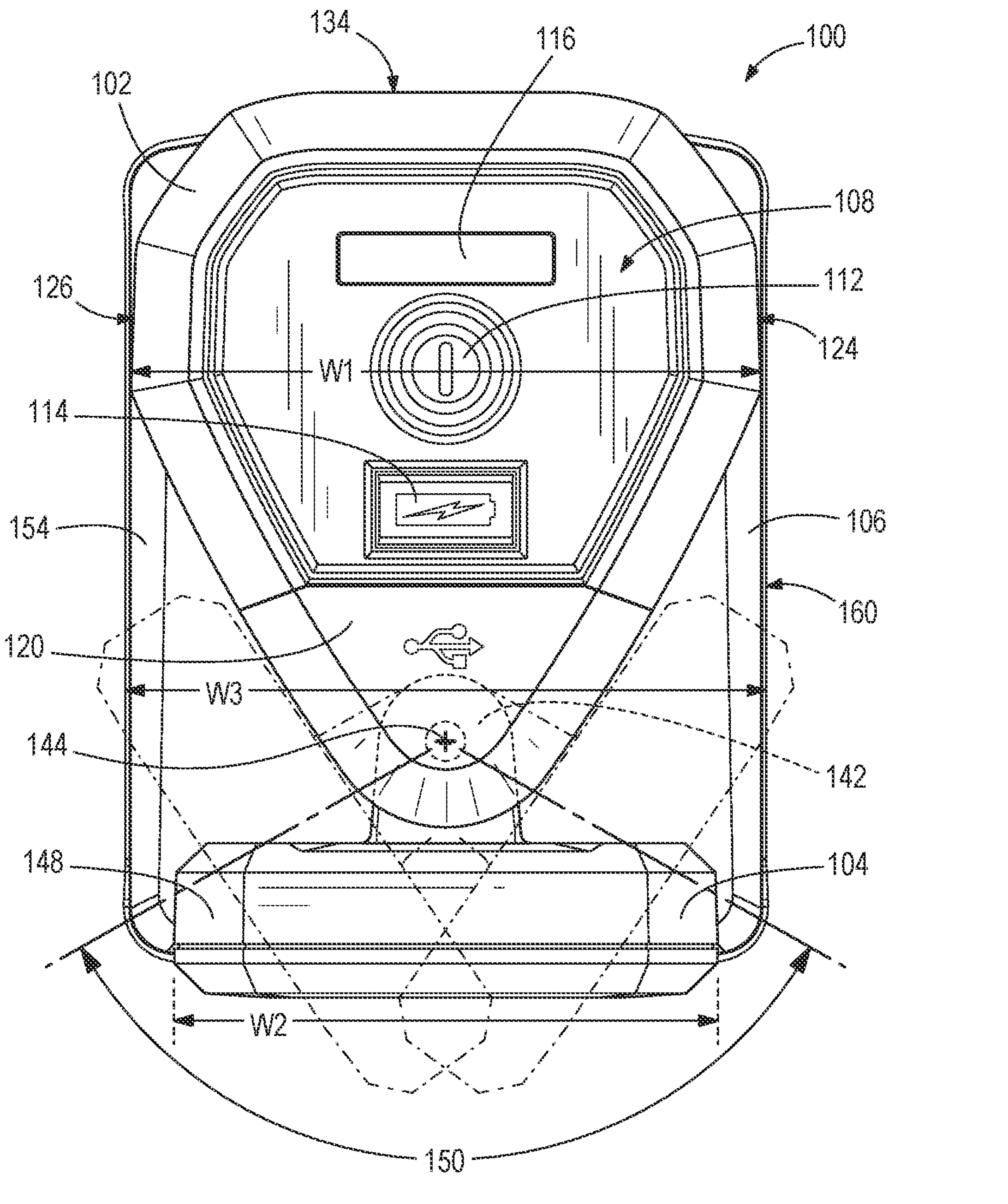
FIG. 4 is a top plan view of the work light of FIG. 1.

As shown in FIG. 4, the light source head 104 may pivot relative to the body 102 along an angle of rotation 150. In some embodiments, the angle of rotation 150 is up to and including 120 degrees. In other embodiments, the angle of rotation 150 is up to and including 180 degrees. In the illustrated embodiment, these angles of rotation 150 are possible due to the shape of the body 102. The body 102 of the illustrated embodiment is narrower adjacent the light source head 104 than it is adjacent the mount surface 134. This configuration of the body 102 allows for a sufficiently wide mount surface 134 while providing clearance for the rotation of the light source head 104. Stated another way, the illustrated embodiment includes a body 102 having horizontal cross-sectional shape that is generally an isosceles triangle with rounded corners. This shape can be seen in FIG. 4.

With reference to FIG. 5, the battery 106 includes a connection portion 152 that is removably received within the battery receptacle 122 of the body 102. The battery 106 further includes an external portion 154 that is disposed outside of the body 102 even when the battery 106 is properly coupled to the body 102. The connection portion 152 of the battery 106 is slidably received in the battery receptacle 122 of the body 102 in a direction parallel to the length L1 of the body 102 in the illustrated embodiment. The length direction of the battery receptacle 122 is parallel with the length L1 of the body 102 and parallel with the pivot axis 144 (FIG. 3) of the light source head 104. In some embodiments, the length of the battery receptacle 122 and the corresponding length of the connection portion 152 of the battery 106 are each longer than one third of the length L1 of the body 102. In some embodiments, the length of the battery receptacle 122 and the corresponding length of the connection portion 152 of the battery 106 are each longer than one half of the length L1 of the body 102.

As shown in FIG. 3, the battery 106 further includes at least one support surface, such as a first support surface 156. This first support surface 156 allows the work light 100 to be oriented and maintained in a vertical standing position on a work surface, such as a horizontal work surface 158 (e.g., a table, a workbench, the ground, etc.). The first support surface 156 is disposed on the external portion 154 of the battery 106 and is perpendicular to the mount surface 134 of the body 102. While the work light 100 is in the vertical standing position, a user may adjust the light source head 104 relative to the body 102 to alter the direction of the light emitted from the light source head 104 to the left or right relative to the horizontal work surface 158. In some embodiments, the first support surface 156 of the battery 106 is perpendicular to the pivot axis 144 of the light source head 104. In some embodiments, the first support surface 156 of the battery 106 is perpendicular to the planar light panel 146.

Figure 7:
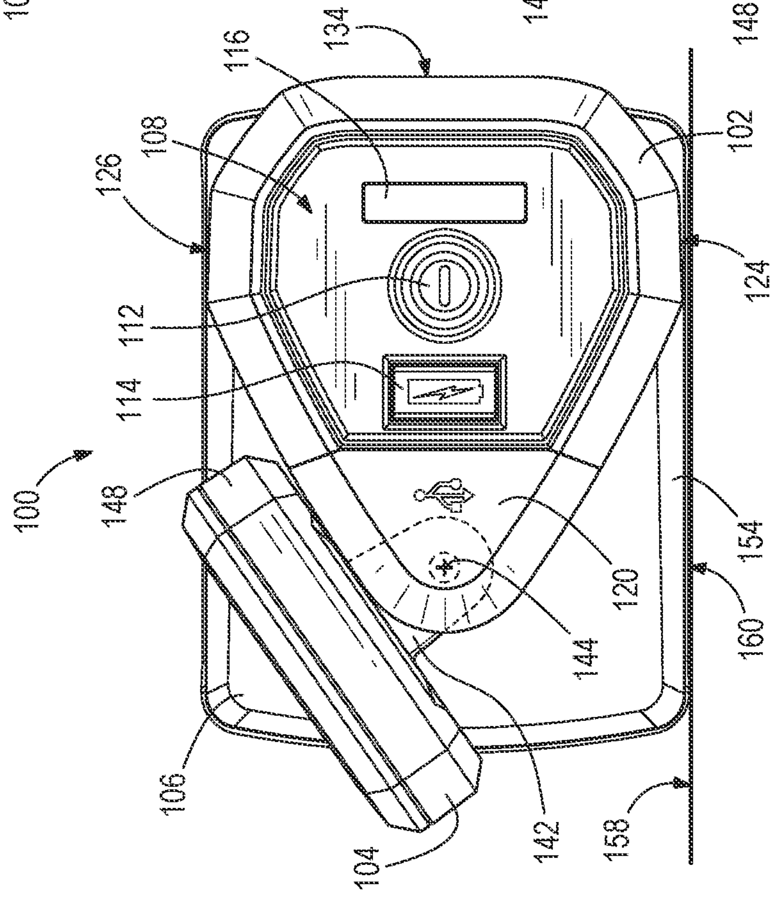
FIG. 7 is a top elevation view of the work light of FIG. 1 laid on its side.

As shown in FIG. 7, the battery 106 may also include at least one additional support surface, such as a second support surface 160. The second support surface 160 is illustrated as being perpendicular to the first support surface 156. This second support surface 160 allows the work light 100 to be oriented and maintained in a horizontal laying position on a work surface, such as the horizontal work surface 158. While the work light 100 is in the horizontal laying position, a user may adjust the light source head 104 relative to the body 102 to alter the direction of the light emitted from the light source head 104 up or down relative to the horizontal work surface 158. In some embodiments, the second support surface 160 of the battery 106 is parallel to the pivot axis 144 of the light source head 104. In some embodiments, the second support surface 160 is perpendicular to the planar light panel 146.

Returning to FIG. 5, the work light 100 is shown mounted to a work surface, such as a vertical work surface 162 (e.g., a wall, strut, cabinet, etc.). In situations where the vertical work surface 162 is made of a material that is not magnetic (such as wood) or is very weakly magnetic, the ferromagnetic members 136 may not work at all or may be insufficient to mount the work light 100 to the vertical work surface 162. In such instances, a user may instead hang the work light 100 by a projection disposed on the vertical work surface 162, such as the nail 164 shown in FIG. 5. The head of the nail 164 is removably received in the recess 140 defined in the mount surface 134 of the body 102. The recess 140 slidably traps the head of the nail 164 such that a user must raise the work light 100 relative to the nail 164 in a direction along the vertical work surface 162 in order to remove the work light 100 from the nail 164.

With reference to FIG. 6, the illustrated embodiment of the work light 100 further includes at least one permanent magnet 166. The permanent magnet 166 is illustrated as being housed within the body 102 of the work light 100 and as being in contact with both of the ferromagnetic members 136. In this illustrated embodiment, each of the ferromagnetic members 136 is magnetized by the permanent magnet 166. The ferromagnetic member 136 may be made of steel, iron, or the like. In other embodiments, however, each of the ferromagnetic members 136 may itself be a permanent magnet. In such embodiments, the additional permanent magnet 166 shown in FIG. 6 may be omitted. In still other embodiments, one or more electromagnets may be included instead of or in addition to one or more permanent magnets.

Figure 8:
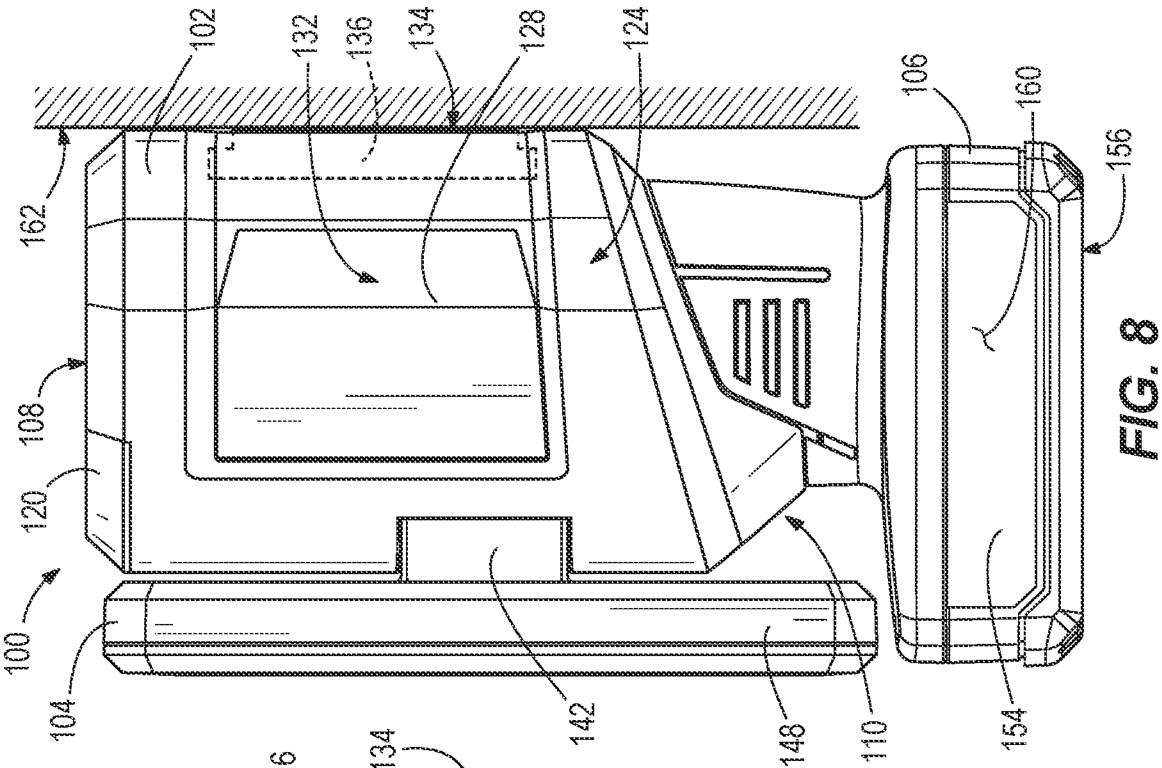
FIG. 8 is a side elevation view of the work light of FIG. 1 coupled to a structure.

As shown in FIG. 8, due to the presence of the ferromagnetic members 136 in the illustrated embodiment, the work light 100 may also be mounted to a vertical work surface 162 without the need for a nail 164 or other projection when the vertical work surface 162 is sufficiently magnetic (such as a structure made at least in part of steel, iron, or the like). In some situations, a user may elect to affix a magnet to a non-magnetic vertical work surface 162 with, for instance, adhesive. In such situations, the ferromagnetic members 136 may magnetically engage the magnet that has been affixed to the vertical work surface 162 to support the work light 100 from the vertical work surface 162 even if the vertical work surface 162 is itself not sufficiently magnetic (such as a vertical work surface 162 made of wood).

As briefly discussed above, the illustrated embodiment of the work light 100 may be sized and shaped for single-handed operation and transport. Further, the work light 100 may be sized and shaped to fit in, for instance, a user's pocket. With reference to FIG. 4, some embodiments of the work light 100 include the body 102 having a width W1 of less than ten centimeters. The width dimension of the body 102 of the work light 100 is perpendicular to the pivot axis 144 of the light source head 104 in the illustrated embodiment. In some embodiments, the width W1 of the body 102 is less than seven centimeters. With reference to FIG. 3, in some embodiments, the length L1 of the body 102 (measured in a direction that is parallel with the pivot axis 144 of the light source head 104 in the illustrated embodiment) is less than fifteen centimeters. In some embodiments, the length L1 of the body 102 is less than ten centimeters. In some embodiments, the distance D between the mount surface 134 of the body and the illuminating face of the planar light panel 146 is less than twelve centimeters. In some embodiments, the distance D between the mount surface 134 and the illuminating face of the planar light panel 146 is less than ten centimeters.

With reference to FIG. 4, some embodiments include the light source head 104 having a width W2 that is slightly less than the width W1 of the body 102. Some embodiments also include the battery 106 having a width W3 that is slightly greater than the width W1 of the body 102. In some embodiments, the width W3 of the battery 106 is between about 1.5 inches and about 3.5 inches (between about 3.8 centimeters and about 8.9 centimeters). In other embodiments, the width W3 of the battery 106 is between about 2.0 inches and about 3.0 inches (between about 5.1 centimeters and about 7.6 centimeters). In some embodiments, the width W2 of the light source head 104 is at least 50% of the width W3 of the battery 106. In other embodiments, the width W2 of the light source head 104 is between about 70% and about 90% of the width W3 of the battery 106.

Referring to FIGS. 3 and 5, the body 102 has a length L1, and the light source head 104 has a length L2 that is longer than the length L1 of the body 102. In some embodiments, the length L2 of the light source head 104 is between about 1.1 times and about 2 times the length L3 of the battery 106. In other embodiments, the length L2 of the light source head 104 is between about 1.1 times and about 1.5 times the length L3 of the battery 106. In some embodiments, the length L1 of the body 102 is between about 1.05 times and about 1.5 times the length L3 of the battery 106. In some embodiments, the length L3 of the battery 106 may be between about 3 inches and about 6 inches (between about 7.6 centimeters and about 15.2 centimeters). In some embodiments, the length L3 of the battery 106 may be about 4.5 inches (about 11.4 centimeters). When the battery 106 is fully inserted into the battery receptacle 122, the work light 100 has a total length L4. In some embodiments, the length L2 of the light source head 104 is between about 50% and about 90% of the total length L4 of the work light 100. In other embodiments, the length L2 of the light source head 104 is between about 75% and about 85% of the total length L4 of the work light 100.

Although various sizes and shapes of batteries may be removably coupled to the body 102 of the work light 100, only a single embodiment of a battery 106 has been shown. Other batteries may be smaller or larger than the battery 106 shown, and these other batteries may also have different shapes from the battery 106 shown. These other batteries may or may not be useful for providing one or more support surfaces to stand the work light 100 or lay the work light 100 in one or more positions. In the illustrated embodiment, the battery 106 is a typical power tool battery that may also be used with, for instance, an electric drill. Of course, other batteries not suitable for power tools may also be used in other embodiments. In some embodiments, the total length L4 of the work light 100, including the battery 106, may be less than fifteen centimeters.

In some embodiments, the work light 100 may also be relatively light and easy to carry by hand. In some embodiments, the work light 100 (including the battery 106) may have a mass that is less than 500 grams. In some embodiments, the work light 100 (including the battery 106) may have a mass that is less than 400 grams. In some embodiments, the work light 100 (including the battery 106) may have a mass that is less than 350 grams.

Although not shown in the illustrated embodiment, some embodiments may include a hook or other hanging structure such that the work light 100 may be hung over the top of a structure, such as a horizontally oriented frame member or the like.

Figure 9:
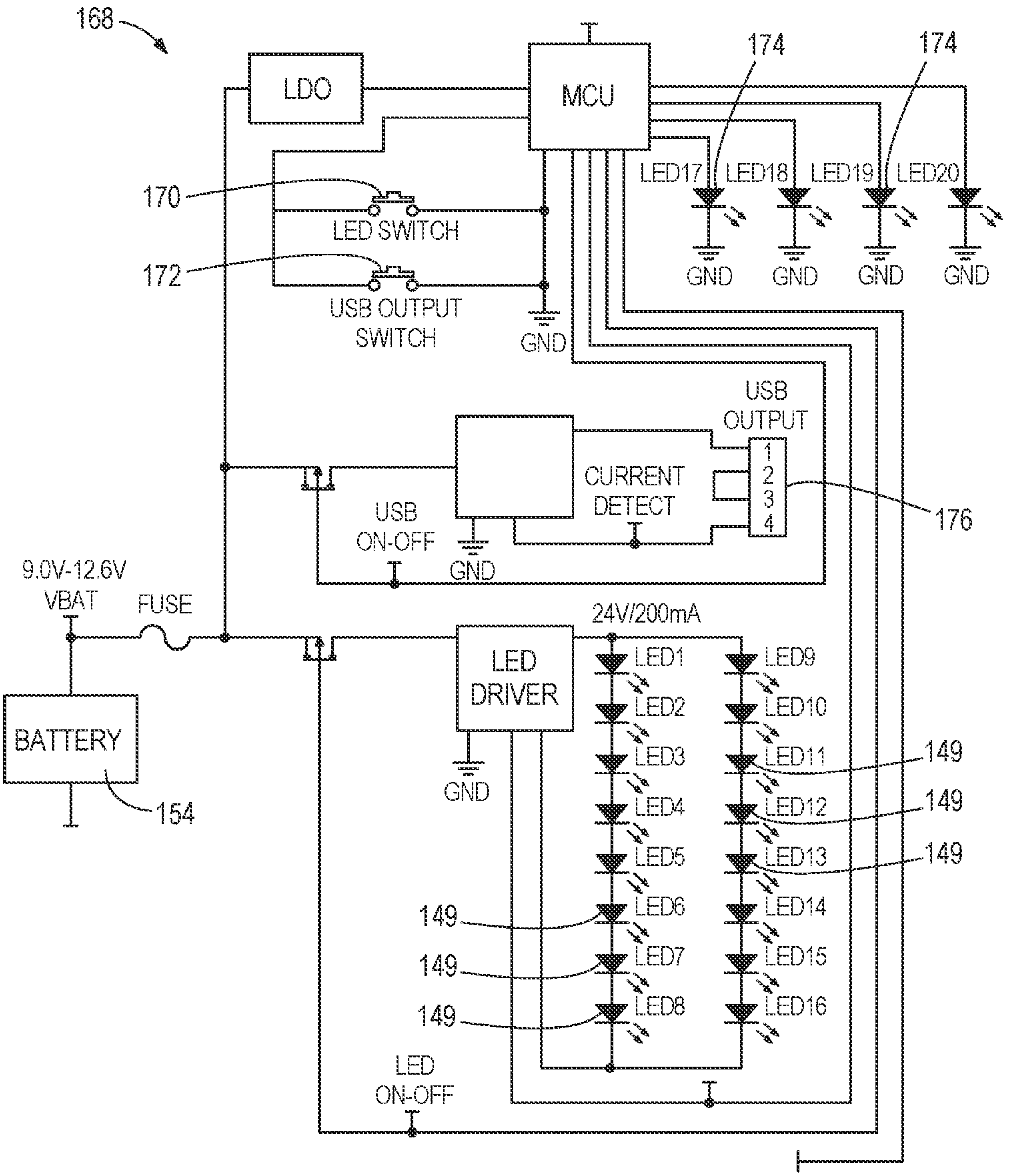
FIG. 9 is a circuit diagram of the work light of FIG. 1.

FIG. 9 illustrates an exemplary circuit diagram 168 for use with the work light 100. The circuit diagram 168 illustrates the layout of various electrical components of the work light 100, including the battery 106, a power switch 170 associated with the power button 112, a wake switch 172 associated with the wake button 114, lights 174 associated with the remaining battery power gauge light 116, a port power output (and/or input) 176 associated with the charging port 118, the LEDs 149, and the like. Of course, the illustrated circuit diagram 168 is only one example of the configuration of the electrical components of the work light 100, and other configurations are also contemplated herein.

Figure 10:
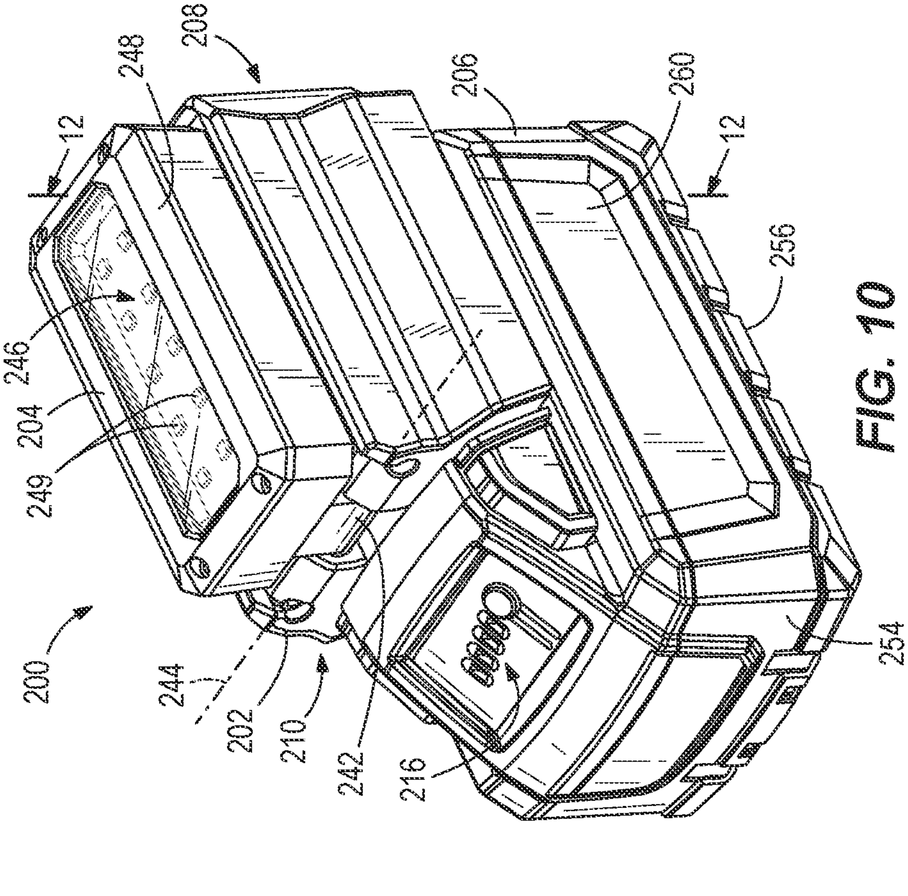
FIG. 10 is a top perspective view of a work light according to an embodiment of the disclosure.

FIG. 10 illustrates an alternative embodiment of a work light 200. Some components of the work light 200 of FIG. 10 are similar to components of the work light 100 of FIG. 1. As such, many of the similar components will be the same number, but increased by a value of one hundred. Some of the similar components may not be discussed further below for the sake of brevity.

Figure 15:
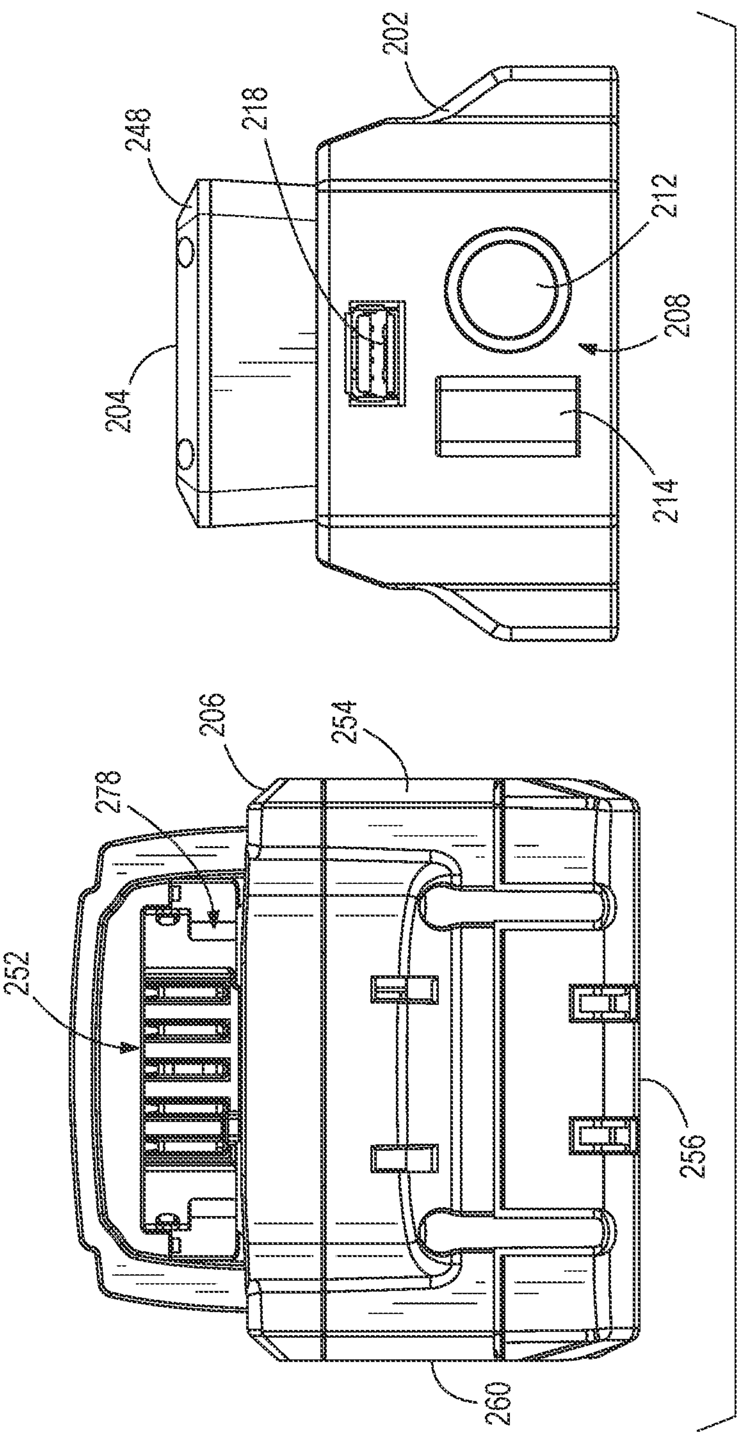
FIG. 15 is a rear elevation view of the work light of FIG. 10 with the battery removed from the body.

The work light 200 of FIG. 10 includes a body 202, a light source head 204, and a removable battery 206. The body 202 includes a first end 208 and a second end 220 opposite the first end 208. In the illustrated embodiment, the first end 208 includes one or more controls, such as a power button 212 and a wake button 214 disposed thereon. In some embodiments, at least one of the body 202 and the battery 206 includes one or more indicators, such as one or more battery power gauge lights 216. As shown in FIG. 15, the body 202 further includes a charging port 218 disposed on the first end 208 of the body 202.

Figure 13:
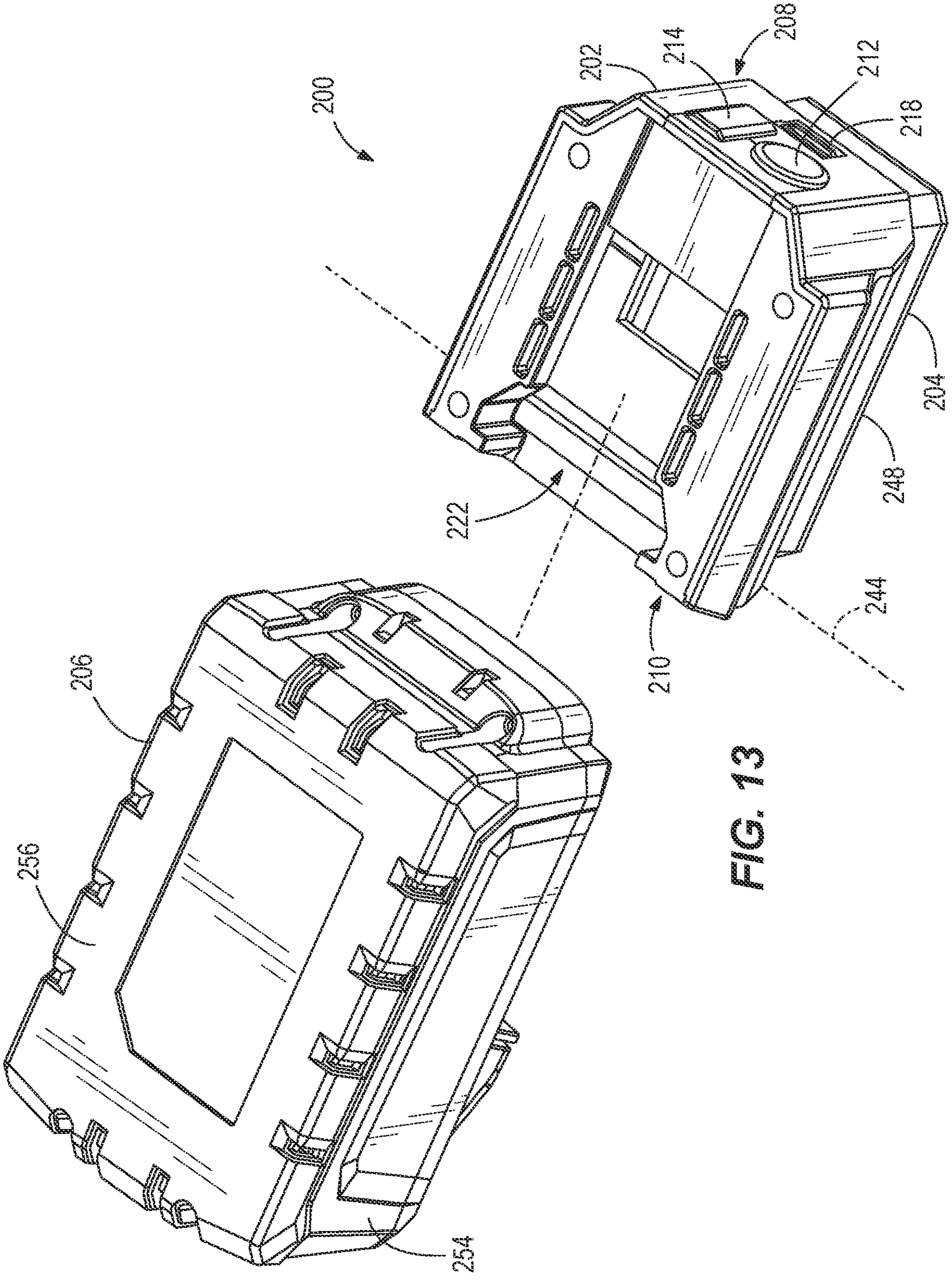
FIG. 13 is a bottom perspective view of the work light of FIG. 10 with the battery removed from the body.

Shown best in FIG. 13, the body 202 of the work light 200 further includes a battery receptacle 222 defined therein. In the illustrated embodiment, the battery receptacle 222 is disposed on a side of the body 202 that is opposite the light source head 204. Stated another way, the battery 206 couples to the body 202 on a side of the body 202 that is opposite the light source head 204. The battery receptacle 222 receives at least a portion of the battery 206 to power the work light 200. In the illustrated embodiment, the battery receptacle 222 is open on two sides of the body 202 such that the battery 206 is slidably received in the battery receptacle 222. In some embodiments, the battery receptacle 222 is oriented such that the battery 206 is slidably received in the battery receptacle 222 in a direction that is parallel with the length L5 of the body 202 (shown in FIG. 14). In some embodiments, at least one of the battery 206 and the body 202 includes one or more movable latching elements configured to secure the battery 206 to the body 202 when the battery 206 is fully inserted in the battery receptacle 222.

Figure 11:
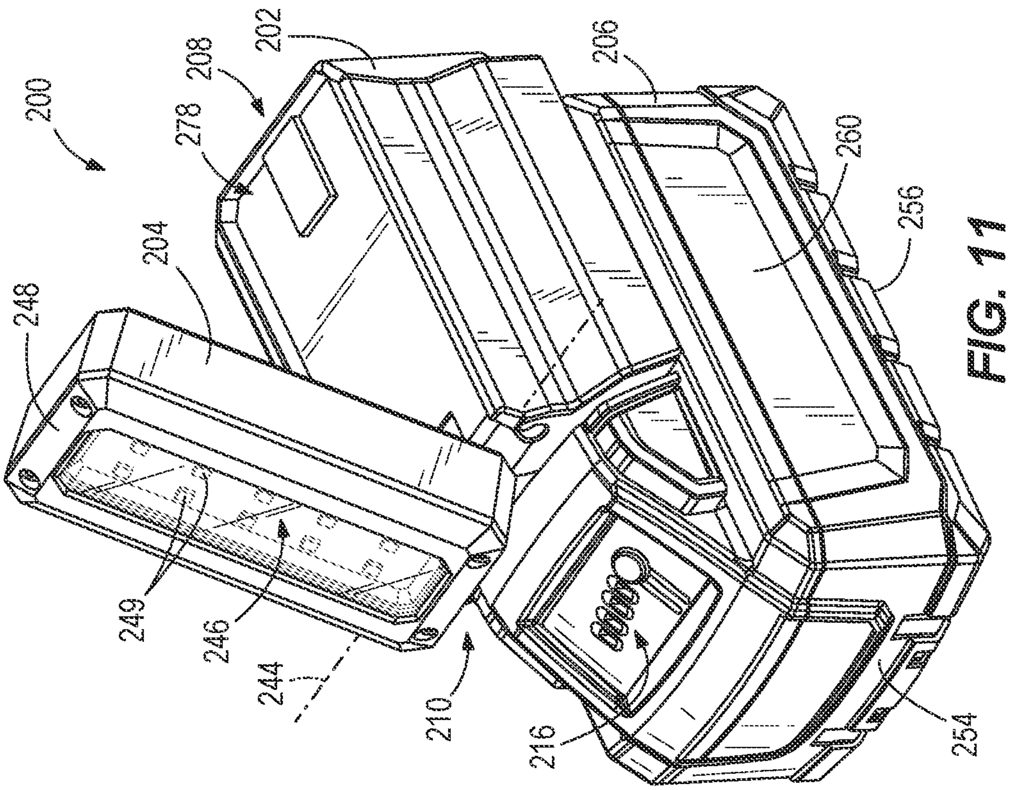
FIG. 11 is a top perspective view of the work light of FIG. 10 with a light source head pivoted away from the body.

With reference to FIGS. 10 and 11, the light source head 204 is pivotably connected to the body 202. In the illustrated embodiment, the light source head 204 is coupled to the body 202 by a single hinge 242. In some embodiments, the hinge 242 is disposed adjacent the second end 210 of the body 202. The light source head 204 is pivotable relative to the body 202 about a pivot axis 244. In the illustrated embodiment, the pivot axis 244 extends in a direction that is perpendicular to the length L5 of the body 202.

The light source head 204 includes a planar light panel 246 surrounded by a head frame 248. The light panel 246 includes a plurality of LEDs 249. The light panel 246 is selectively powered by the battery 206. The illustrated battery 206 is a power tool battery having a voltage of, for example, 18 volts.

Figure 12:
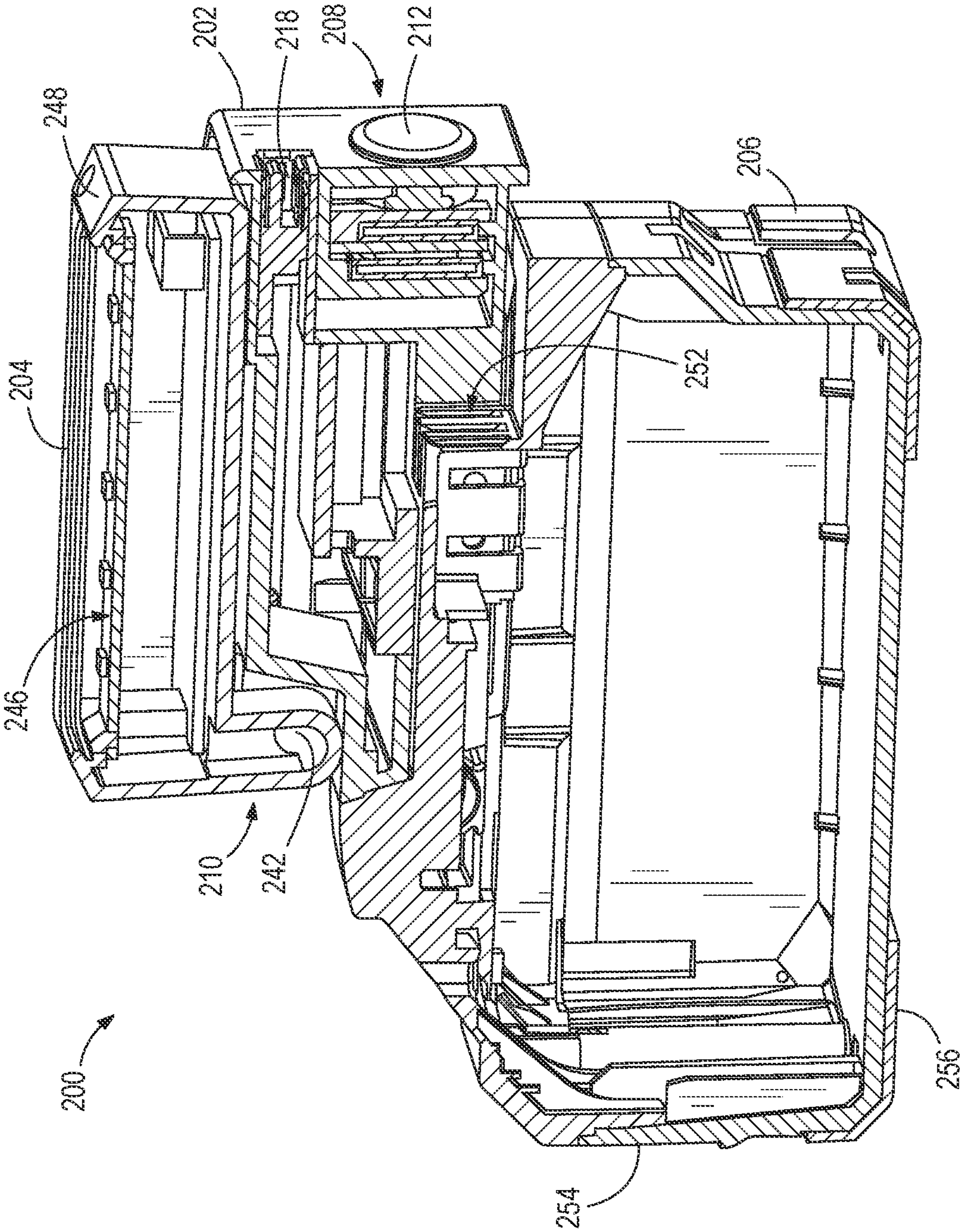
FIG. 12 is a perspective cross-sectional view of the work light of FIG. 10.
Figure 14:
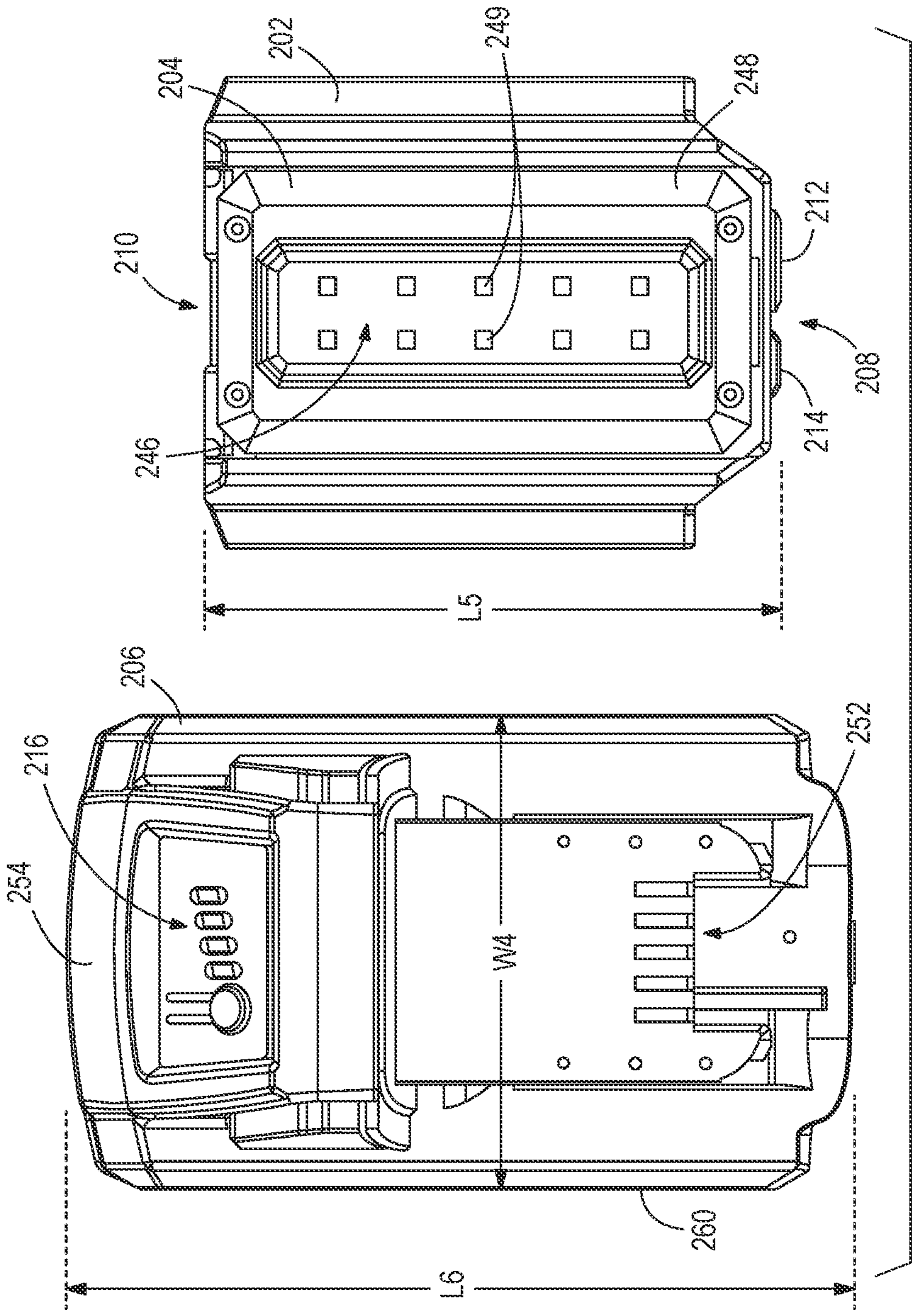
FIG. 14 is a top plan view of the work light of FIG. 10 with the battery removed from the body.

With reference to FIGS. 12 and 14, the battery 206 includes a connection portion 252 that is removably received within the battery receptacle 222 of the body 202. The battery 206 further includes an external portion 254 that is disposed outside of the body 202 even when the battery 206 is properly coupled to the body 202.

As shown in FIG. 13, the battery 206 further includes at least one support surface, such as a first support surface 256. The first support surface 256 is disposed on the external portion 254 of the battery 206. A user may adjust the light source head 204 relative to the body 202 to alter the direction of the light emitted from the light source head 204 at an angle relative to the first support surface 256 (angled relative to the floor and movable up and down relative to the floor, for instance).

Figure 16:
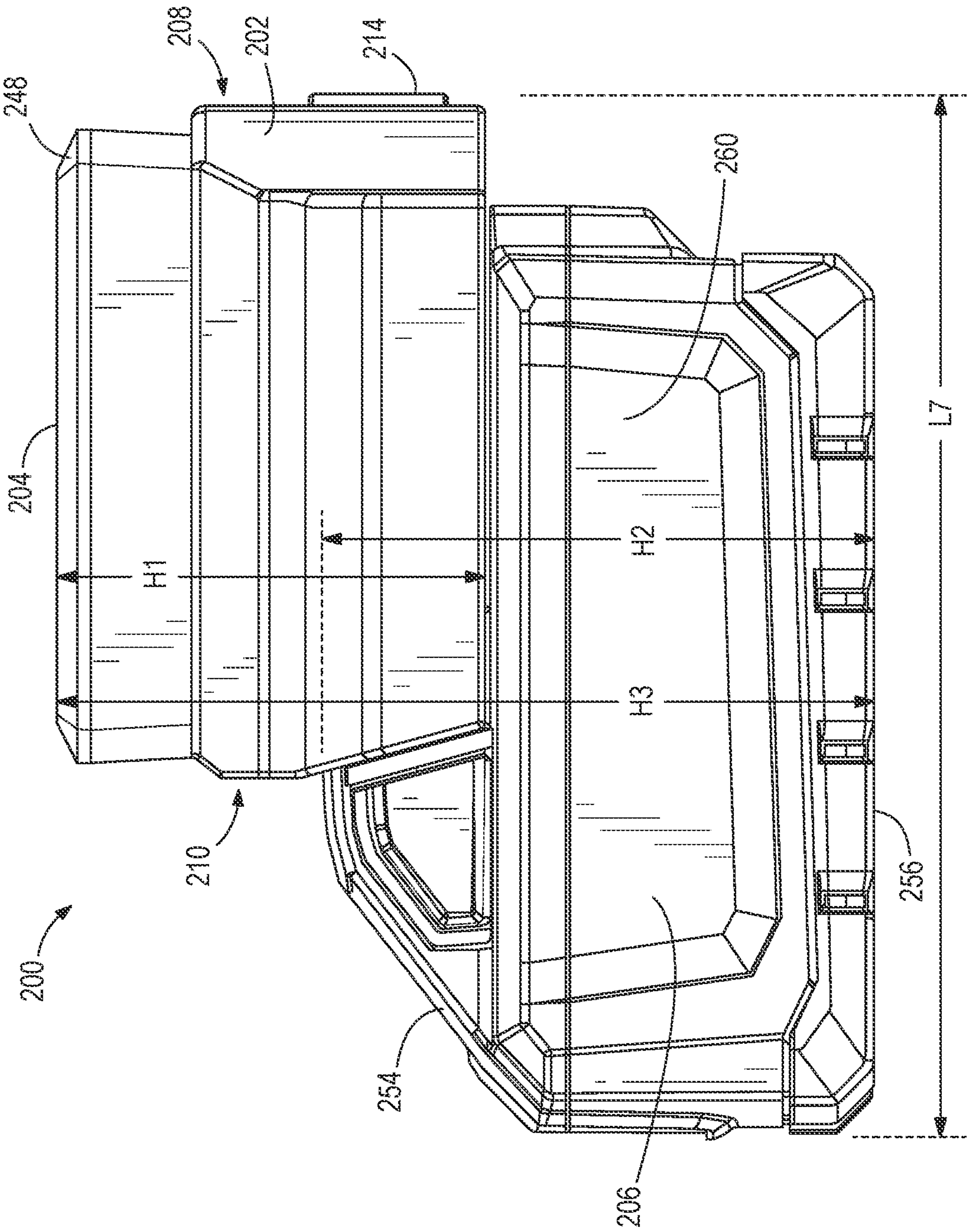
FIG. 16 is a side elevation view of the work light of FIG. 10.

As shown in FIG. 16, the battery 206 may also include at least one additional support surface, such as a second support surface 260. The second support surface 260 is illustrated as being perpendicular to the first support surface 256. This second support surface 260 allows the work light 200 to be oriented and maintained in a horizontal laying position on a work surface, such as the floor. While the work light 200 is in the horizontal laying position, a user may adjust the light source head 204 relative to the body 202 to alter the direction of the light emitted from the light source head 204 left or right relative to the work surface.

Referring particularly to FIG. 11, the body 202 includes a recess 278 defined therein. In the illustrated embodiment, the recess 278 is defined in the body 202 on a side of the body 202 that is opposite the battery receptacle 222. The light source head 204 is at least partially received within the recess 278 when the light source head 204 is positioned as shown in FIG. 10.

As shown in FIGS. 14 and 16, in some embodiments, the length L5 of the body 202 is less than the length L6 of the battery 206. For example, the length L5 of the body 202 may be between about 40% and about 90% of the length L6 of the battery 206. In some embodiments, the length L5 of the body 202 may be between about 50% and about 85% of the length L6 of the battery 206. In some embodiments, the height H1 of the body 202 and the light source head 204 is less than a height H2 of the battery 206. For example, the height H1 of the body 202 and the light source head 204 may be between about 40% and about 90% of the height H2 of the battery 206. In some embodiments the height H1 of the body 202 and the light source head 204 may be between about 60% and about 90% of the height H2 of the battery 206.

In some embodiments, the length L6 of the battery 206 is between about 3 inches and about 6 inches (between about 7.6 centimeters and about 15.2 centimeters), or between about 4 inches and about 5 inches (between about 10.2 centimeters and about 12.7 centimeters) in other embodiments. In some embodiments, the width W4 of the battery 206 is between about 2 inches and about 4 inches (between about 5.1 centimeters and about 10.2 centimeters), or between about 2.5 inches and about 3.5 inches (between about 6.4 centimeters and about 8.9 centimeters) in other embodiments. In some embodiments, the height H2 of the battery 206 is between about 1 inch and about 6 inches (between about 2.5 centimeters and about 15.2 centimeters), or between about 2 inches and about 4 inches (between about 5.1 centimeters and about 10.2 centimeters) in other embodiments.

With reference to FIG. 16, when the body 202 of the work light 200 is coupled to the battery 206, the body 202, light source head 204, and battery 206 define a total height H3 and a total length L7 of the work light 200. In the illustrated embodiment, the total height H3 is approximately double the height H1 of the body 202 and light source head 204. In addition, the total length L7 is between about 5% and about 25% greater than the length L6 of the battery 206. In some embodiments, the total length L7 may be equal to the length L6 of the battery 206. In still other embodiments, the length L6 of the battery 206 may be between about 85% and about 95% of the total length L7.

Although particular embodiments have been shown and described, other alternative embodiments will become apparent to those skilled in the art and are within the intended scope of the independent aspects of the disclosure. Various features of the disclosure are set forth in the claims.

What is claimed is:

1. A work light comprising:
- a body including
  - a first side,
  - a second side opposite the first side,
  - a mount surface,
  - a pair of ferromagnetic members coupled to the body and disposed adjacent the mount surface on the first side of the body, the pair of ferromagnetic members defining a space therebetween, and
  - a recess defined in the mount surface in the space between the pair of ferromagnetic members, the recess is a keyhole slot configured to receive a nail from which the work light can be hung; and
- a light source pivotably coupled to the body opposite the mount surface and disposed on the second side of the body, such that the light source pivots relative to the body about a vertical axis when the work light is hung using the recess.

2. The work light of claim 1, wherein each of the pair of ferromagnetic members includes a permanent magnet.

3. The work light of claim 1, further comprising a permanent magnet disposed within the body of the work light, the permanent magnet magnetizing each of the pair of ferromagnetic members.

4. The work light of claim 1, wherein each of the pair of ferromagnetic members is at least partially exposed on the mount surface of the body.

5. The work light of claim 1, wherein each of the pair of ferromagnetic members includes a length that extends in a direction that is parallel with a length of the body.

6. The work light of claim 1, wherein
- the mount surface includes an indentation,
- the pair of ferromagnetic members are disposed in the indentation, and
- the recess is disposed in the indentation.

7. The work light of claim 1, wherein the body is narrower adjacent the light source than adjacent the mount surface.

8. The work light of claim 1, wherein the body includes a first end having a power button and a second end opposite the first end, the second end having a battery receptacle configured to receive a battery, and wherein the power button is actuated in a direction parallel to the vertical axis.

9. A work light comprising:
- a body including a first end, a second end opposite the first end, and a mount surface disposed between the first end and the second end, the body having a first width;
- a light source head pivotally coupled to the body to pivot about a pivot axis and disposed opposite the mount surface of the body, the light source head having a length and a second width; and a battery removably coupled to the second end of the body, the battery including a first support surface and a second support surface perpendicular to the first support surface, the battery having a third width that is greater than the second width of the light source head, wherein the mount surface allows the work light to be mounted to a vertical work surface, wherein the first support surface allows the work light to be oriented and maintained in a vertical standing position on a horizontal work surface, such that the length of the light source head is oriented perpendicular to the horizontal work surface, and wherein the second support surface allows the work light to be oriented and maintained in a horizontal laying position on the horizontal work surface, such that the length of the light source head is oriented parallel to the horizontal work surface.

10. The work light of claim 9, wherein in the vertical standing position, the pivot axis is perpendicular to the horizontal work surface, such that the light source head pivots in a left direction and a right direction relative to the horizontal work surface.

11. The work light of claim 9, wherein in the horizontal laying position, the pivot axis is parallel to the horizontal work surface, such that the light source head pivots in an upward direction and a downward direction relative to the horizontal work surface.

12. The work light of claim 9, wherein a portion of the battery extends under the light source head.

13. The work light of claim 9, further comprising a recess defined in the mount surface, the recess configured to receive a nail to hang the work light from the vertical work surface.

* * * * *